(No Model.) 4 Sheets—Sheet 1.
G. KYNOCH & H. A. SCHLUND.
METHOD OF MANUFACTURING PROJECTILES.
No. 407,536. Patented July 23, 1889.
*Fig.1.*
*Fig.2.*
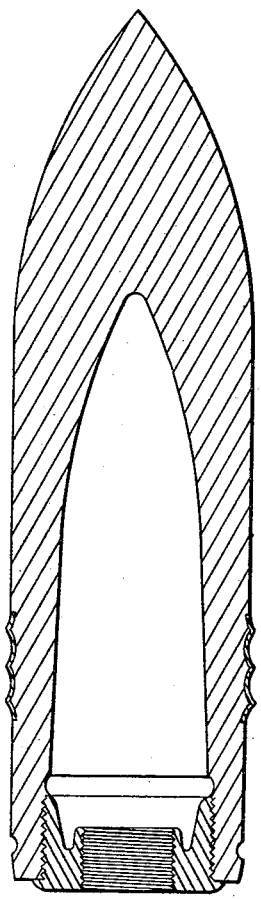
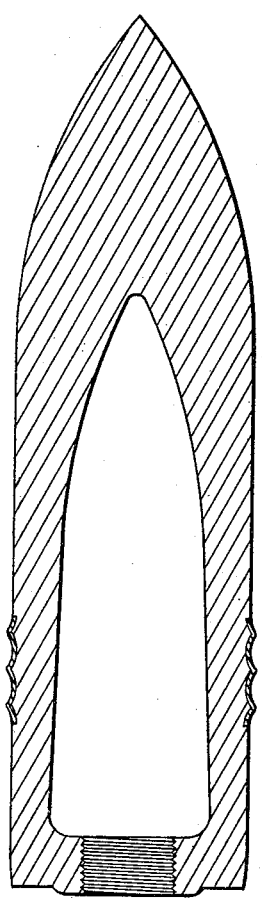
Witnesses
Inventors (No Model.) 4 Sheets—Sheet 2.
G. KYNOCH & H. A. SCHLUND.
METHOD OF MANUFACTURING PROJECTILES.
No. 407,536. Patented July 23, 1889.
Fig. 3. 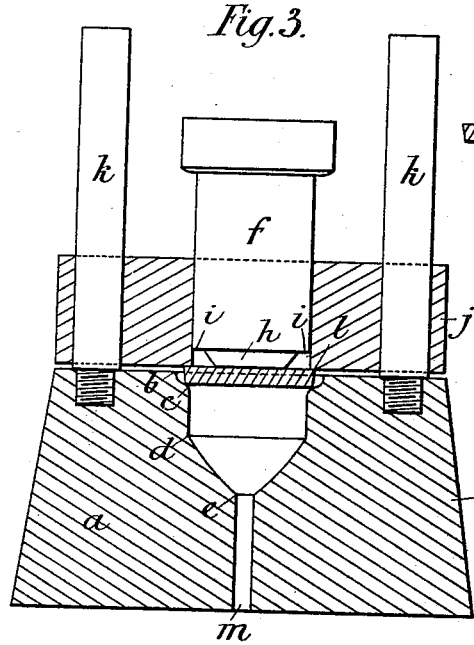 Fig. 2.ª Fig. 4. 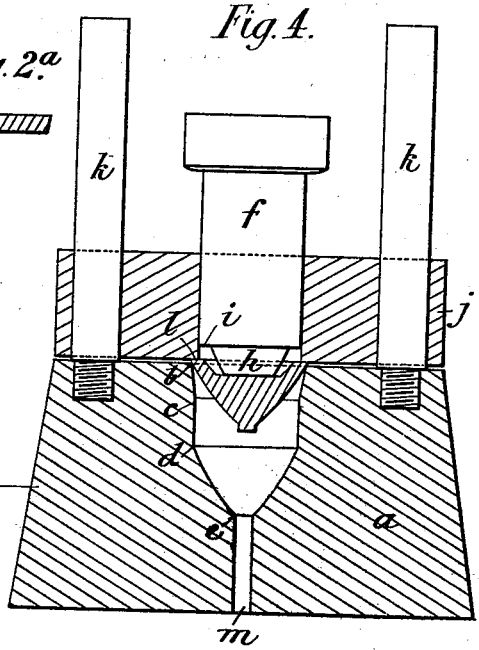
Fig. 3.ª 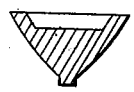 Fig. 4.ª 
Fig. 5. 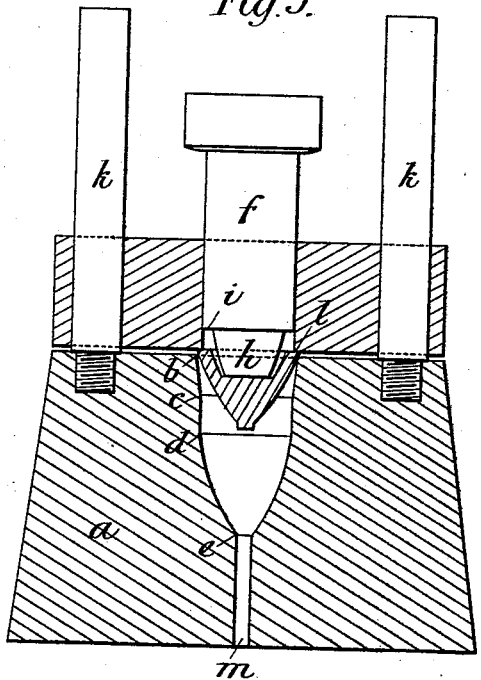 Fig. 5.ª 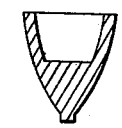
Witnesses
E. T. Walker
L. B. Whitaker.
Inventors
George Kynoch
Henry A. Schlund
By their attys.
Whitaker & Prevost (No Model.) 4 Sheets—Sheet 3.
G. KYNOCH & H. A. SCHLUND.
METHOD OF MANUFACTURING PROJECTILES.
No. 407,536. Patented July 23, 1889.
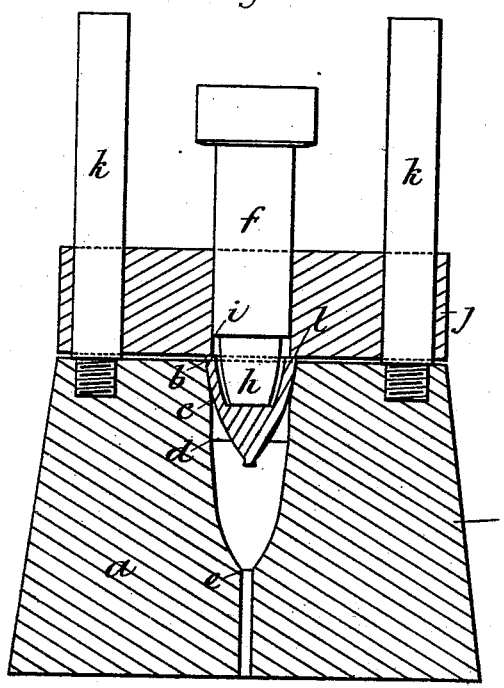
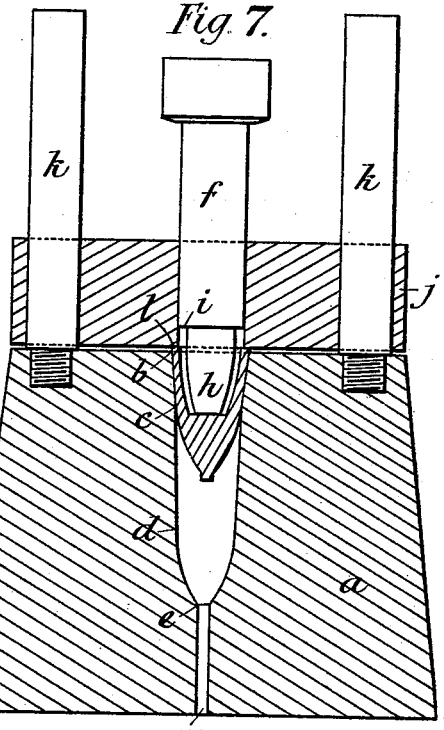
Fig. 6.ª
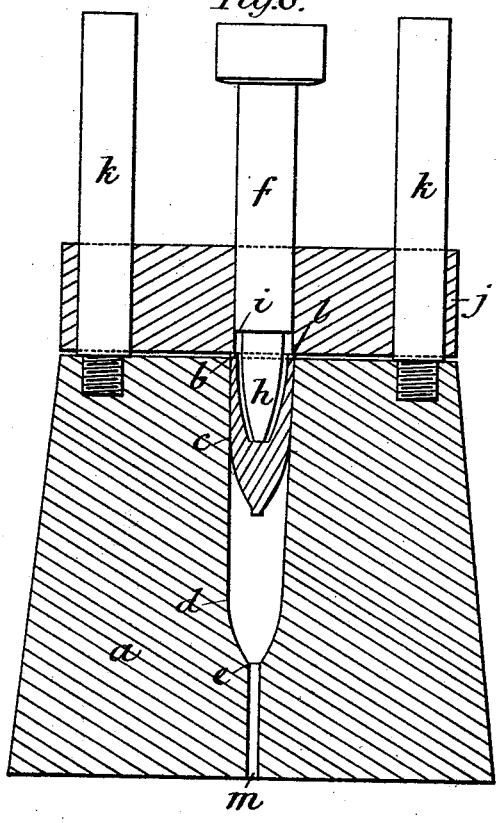
Fig. 7.ª
Fig. 8.ª
Witnesses
E. T. Walker
L. W. Whitaker
Inventors
George Kynoch
Henry A. Schlund
By their attys.
Whitaker & Prevost (No Model.) 4 Sheets—Sheet 4.
G. KYNOCH & H. A. SCHLUND.
METHOD OF MANUFACTURING PROJECTILES.
No. 407,536. Patented July 23, 1889.
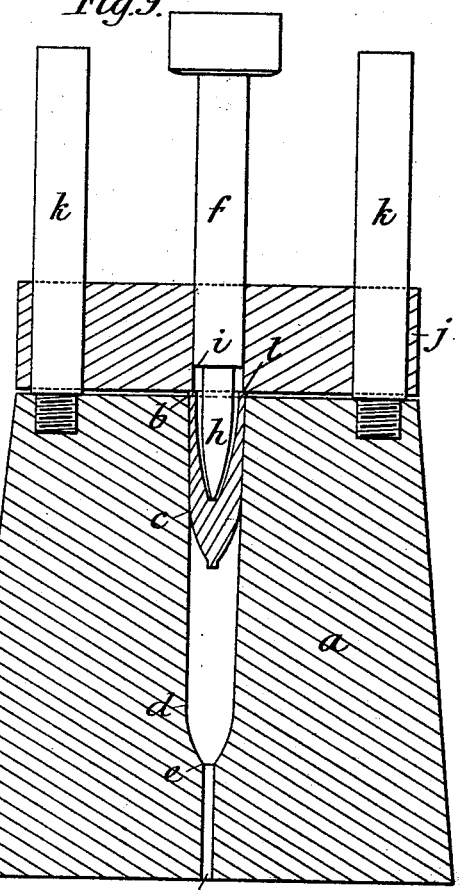
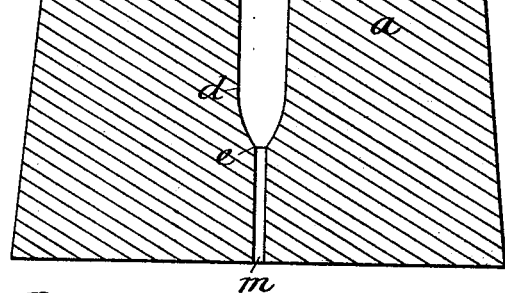
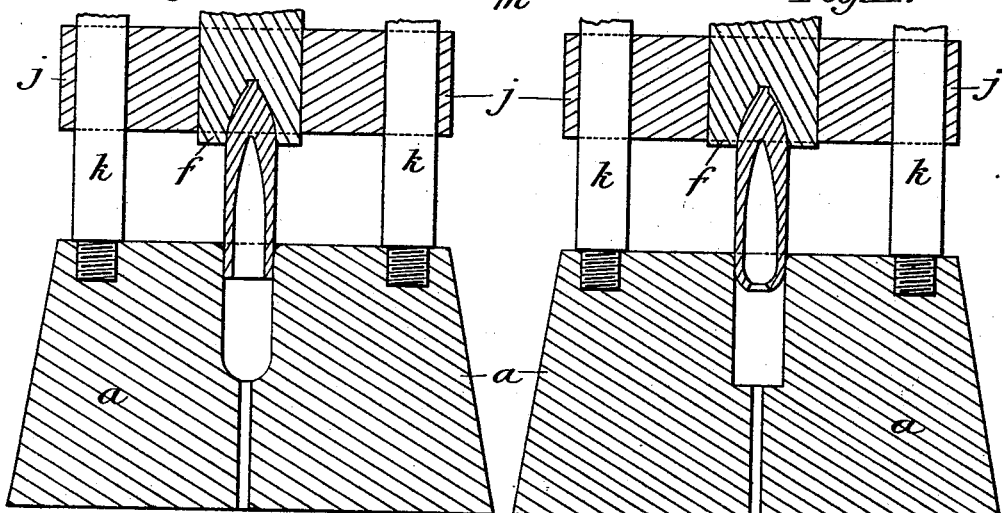
Witnesses
Inventors

UNITED STATES PATENT OFFICE.

GEORGE KYNOCH AND HENRY AUGUSTUS SCHLUND, OF BIRMINGHAM, COUNTY OF WARWICK, ENGLAND.

METHOD OF MANUFACTURING PROJECTILES.

SPECIFICATION forming part of Letters Patent No. 407,536, dated July 23, 1889.

Application filed January 5, 1888. Serial No. 259,865. (No model.)

*To all whom it may concern:*

Be it known that we, GEORGE KYNOCH and HENRY AUGUSTUS SCHLUND, subjects of the Queen of Great Britain, residing at Birmingham, in the county of Warwick, England, have invented a new and useful Improvement in the Method of Manufacturing Projectiles, of which the following is a specification.

Our invention relates to the manufacture of hollow projectiles, and especially to that class of projectiles having heads of ogival shape in transverse section and of very considerable thickness—such, for instance, as the Hotchkiss steel shell. The method hitherto generally adopted of manufacturing such projectiles has been to bore and turn solid pieces of metal, a recessed cap or plug being finally screwed into the base of each to close the chamber. This method of manufacture is very slow and consequently very costly. Attempts have been made to reduce the cost of such manufacture by forging or drawing a disk of metal into the required shape; but in this case, in order to procure the required thickness of head, it was necessary to make the disk considerably thicker at the center than at the other parts, or the head was formed by closing in and welding the sides. In either case the strength of the projectile was considerably impaired—viz., in the first case owing to the fact that the thickening of the disk at the center caused a disturbance of the fiber of the metal, and in the second case that the weld joints were at the head of the projectile, and it has been found practically impossible to form ogival-headed projectiles with sides of gradually-decreasing thickness.

The object of our invention is to produce hollow projectiles from plain disks of metal and without any welding, so that the molecules of the metal may be uniformly distributed and ultimately to be in the position required.

To this end it consists, essentially, in subjecting the metal disks to a series of operations, during each of which a pushing, drawing, and punching action is exerted upon the blank, all as hereinafter described. The disk employed by us is of moderate thickness and its shorter dimension will generally be less than one-fourth of its greater.

In carrying our invention into practice we employ a series of special shaping or forming tools, which are successively smaller in size, so that after the blank has undergone one pushing, drawing, and punching operation in one set of tools it may be brought under the operation of the next set, and so on until it is formed to the required size and shape.

The shapes of and mode of working our special tools are hereinafter described and illustrated in the accompanying drawings.

In connection with each of the said special tools we use a punching-tool, the body portion of which is adapted to fit the parallel portion of the forming tool or die, and which is provided with a head. This head is of smaller diameter than the body of the punching-tool, so that a shoulder is formed around the said head. The end of the head is flat, and the sides thereof are shaped to give the required shape to the interior of the projectile. The body and head of each successive punching-tool are smaller in diameter and longer than the last, until the head of the last punching-tool corresponds to the required internal shape of the projectile.

The operation of a punching-tool and forming tool or die such as or constructed substantially in the manner hereinbefore described is as follows, that is to say: The disk from which the shell is formed, and the thickness and diameter of which are calculated to contain the necessary quantity of metal, is placed while hot in the top or open part of the forming tool or die. The punching-tool is then caused to descend to push the blank into the forming tool or die. During the first part of the punching movement the disk is forced through the tapering part of the forming tool or die, whereby its sides are drawn in, and as the pushing continues the metal is forced forward into the concave bottom of the forming tool or die by the head and shoulders of the punching or pushing tool. It is important to note that in order to effect the thickening of the head of the projectile the escape of the metal around the punching-tool should be prevented, and this is accomplished by making the body of the punching-tool of the same diameter as the parallel part of the forming tool or die, so that no passage is left between the sides of the punching-tool and the forming tool or die, the metal being forced forward ahead of the punching-tool and caused to take the ogival shape of the forming tool or die.

In order to form the base of the shell, it is first pressed down into a forming tool or die having a rounded bottom and parallel sides, whereby its edges are drawn in, and it is then again forced into a second forming tool or die having a flat bottom, whereby its end is punched or forced into shape.

In order to enable our invention to be fully understood, we will proceed to describe how the same may be carried into practice by reference to the accompanying drawings, in which—

Figure 1 is a longitudinal section of a three-pound Hotchkiss shell of ordinary construction, which we take as an example in order to illustrate our method of manufacture and the working of our special tools. Fig. 2 is a similar view of a shell of the same kind manufactured according to our invention. Figs. 3 to 11 show a series of forming tools or dies and punching-tools, drawn to a reduced scale, suitable for manufacturing a shell similar to that shown in Fig. 2. Figs. $2^a$ to $11^a$ show the blank and the various forms which it assumes during its manufacture.

$a$ $a$ are the forming tools or dies, the openings in which taper from $b$ to $c$, are parallel from $c$ to $d$, and concave from $d$ to $e$.

$f f$ are the punching-tools, the diameters of which correspond with the diameters of the parallel parts $b$ to $c$ of the respective forming tools or dies to which they belong. $h$ $h$ are the heads of these punching-tools, all of which, except that shown in Fig. 9, are flat at the extreme end. $i$ $i$ are the shoulders, which prevent the metal from escaping upward from the forming tools or dies.

$j$ $j$ are plates, which serve to guide the punching-tools $b$, and which themselves slide upon rods $k$ $k$, secured to the forming tools or dies $a$ $a$. The said plates also serve to center the blanks or partly-formed projectiles in their respective forming tools or dies by bearing upon their edges, as shown at $l$. The guide-plates $j$ $j$ and the punching-tools $f f$ may be operated by hydraulic or other power.

$m$ $m$ are holes through which an instrument or pusher can be introduced to remove the wholly or partially finished projectile from the forming tools or dies.

In Fig. 3 we show a blank in position upon the forming tool or die ready to be operated upon, and Fig. $3^a$ shows the shape imparted to the blank during the first operation. The blank Fig. $3^a$ is next acted upon by the punching-tool and shaping tool or die Fig. 4 it being noticed that the head of the punching-tool is longer and of smaller diameter than the head of the preceding punching-tool, and that the shaping tool or die is smaller in diameter and deeper, this being the case with each succeeding punching-tool and forming tool or die relative to that preceding it. In the forming tool or die Fig. 4 the blank receives the form shown in Fig. $4^a$, and as it is introduced successively into the forming tools or dies shown in Figs. 5, 6, 7, 8, and 9, it receives the shapes shown in Figs. $5^a$, $6^a$, $7^a$, $8^a$, and $9^a$ respectively. It will be noticed that the interior of the forming tool or die and the exterior of the head of the punching-tool shown in Fig. 9 correspond to the external and internal size and shape of the sides and head of the finished shell respectively.

After the body and head of the projectile are shaped, as hereinbefore described, we subject the projectile to other pushing, drawing, and punching operations by means of the punching-tools and forming tools or dies shown in Figs. 10 and 11. The punching-tools in this case are provided with recesses adapted to receive the head of the shell, while the base of the opening in the forming tool or die is in one case made tapering or rounding, to form the base of the projectile as it is forced downward to give it the approximate shape shown in Fig. $10^a$, and in the other case flat, to give the base the final shape shown in Fig. $11^a$.

It is to be understood that in each of the before-mentioned operations in the forming tools or dies the metal to be operated upon is suitably heated throughout except in the operation illustrated by reference to Figs. 10 and 11, in which case only the extremities of the sides are heated, to obviate the deformation of the other parts of the projectile under the pressure of the punching-tool.

After the projectile has been completely formed in the forming tools or dies, the hole $n$, Fig. $11^a$, in the base thereof is broached out and the protuberance O (formed by the entrance of a portion of the metal into the holes $m$) is ground off or otherwise removed, so as to give to the front of the projectile the required shape.

Although we have, for the sake of example, described the manufacture of projectiles having ogival heads, it will be obvious that our improvements are applicable to the manufacture of hollow shells or projectiles having heads of other shapes.

Having now particularly described and ascertained the nature of our said invention and in what manner the same is to be performed, we declare that what we claim is—

The improvement in the art of forming the shell of a pointed projectile, which consists in subjecting a disk of metal of uniform thickness to the action of dies by which the metal is cupped and driven upon itself toward the center, whereby a shallow cup having a thickened and compressed end is formed, then by the successive action of other dies simultaneously extending in length the cup-shaped article thus formed and thinning the walls, and finally finishing the shell by partially closing the open end thereof, substantially as described.

GEO. KYNOCH.
HENRY AUGUSTUS SCHLUND.

Witnesses:
GEO. WALLACE,
ALEXR. HASSALL.